June 5, 1951   N. H. WILLIAMS   2,556,019
MANUFACTURE OF WATER GAS OR GAS CONSISTING LARGELY
OF CARBON MONOXIDE AND HYDROGEN
Filed Jan. 7, 1947

Patented June 5, 1951

2,556,019

UNITED STATES PATENT OFFICE 2,556,019

MANUFACTURE OF WATER GAS OR GAS CONSISTING LARGELY OF CARBON MONOXIDE AND HYDROGEN

Norman Henry Williams, Westminster, England, assignor, by mesne assignments, to Humphreys & Glasgow Limited, Westminster, England Application January 7, 1947, Serial No. 720,655
In Great Britain January 17, 1946

3 Claims. (Cl. 48—208)

This invention has reference to the manufacture of water-gas or a gas consisting largely of carbon monoxide and hydrogen by a cyclic process in which the air and steam and/or other gases supplied to the fuel bed are preheated, and in particular to such a process in which some or all of the air is preheated in a recuperative heat exchanger by the gaseous products of its passage through the generator, with or without secondary combustion of these gases prior to their passage through the heat exchanger, and some or all of the steam is preheated in the same heat exchanger by the hot water-gas and undecomposed steam resulting from the passage of the steam through the generator. Other gases, such as hydrocarbon containing gases, which it is desired to subject to reaction or thermal treatment in the fuel bed may also be supplied to the generator with or without preheating in the said heat exchanger and with or without admixture with steam.

Figure 1:
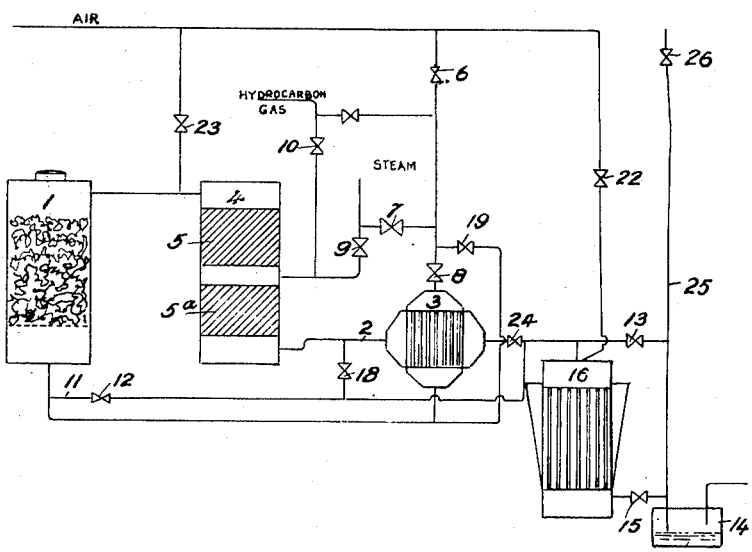
Figure 2:
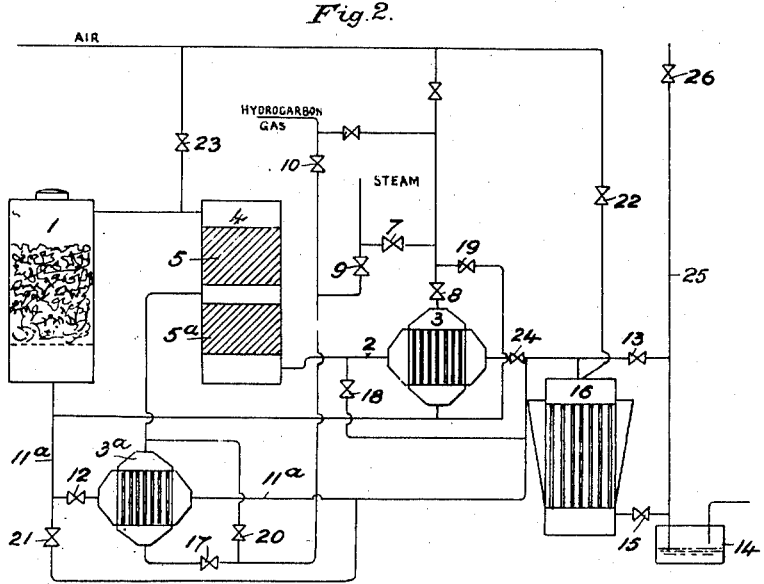
Figure 2:

According to this invention whereof two arrangements are diagrammatically illustrated in Figs. 1 and 2 of the accompanying drawings in apparatus for carrying out the process referred to there is provided in the gas path between the water gas generator 1 and the hot gas inlet 2 to the heat exchanger 3 a regenerator 4, whereby cyclic fluctuations in the temperature of the gaseous products and undecomposed steam passing therethrough to the heat exchanger are reduced in extent and rapidity and more constant conditions are ensured at the hot end of the heat exchanger, thereby reducing troubles arising from continual cyclic thermal expansion and contraction. More constant temperature of the air and steam and any other gases preheated in the heat exchanger are also secured.

Moreover, by providing a sufficient mass of heat storing refractory material 5, 5ª within the regenerator 4, steam which is required to flow through the generator 1 in the reverse direction to the air and steam (derived through valves 6, 7 and 8) preheated in the heat exchanger 3, for example steam for back run gas making, may upon opening valve 9 be preheated by passage through the part 5 of the heat storage mass nearest to the generator, instead of in the heat exchanger 3, without directly cooling the portion 5ª of the regenerative mass adjacent to the heat exchanger 3; or any gas, for example, hydrocarbon-containing gas, supplied through valve 10, which it is desired to subject to thermal treatment in the fuel bed of the generator by its passage, in the downward direction, through the fuel bed may also be preheated in this way. For the removal of gases formed by downward flow through the fuel bed, an offtake 11 including valves 12, 13 is provided from the bottom of the generator to the wash box 14. In cases in which it is desired to recover the heat from gases leaving the generator through this offtake they may upon closing valve 13 and opening another valve 15, Fig. 1, be led to the wash box 14 through a wasteheat boiler 16. Again, as shown in Fig. 2, gases formed by downward flow through the fuel bed and leaving the generator from the bottom by way of an offtake 11ª, may pass through a recuperative heat exchanger 3ª, thence to the wash box 14 or waste heat boiler 16 as in Fig. 1. In such modified arrangement steam or gas or both may be supplied to the heat exchanger 3ª by way of either valve 9, valve 10 or both, and valve 17 there to be preheated and then passed through the upper part of the regenerator 4 for further preheating in the checkerwork 5 on their way to the generator.

Provision may be made for regulating the degree of preheating of the air and/or steam. For example, means, such as valves 8, 19, 18 and 24 in Figure 1 and 8, 19, 18, 24, 17, 20, 32 and 21 in Figure 2, may be provided for enabling part of the hot gases and/or part of the air and/or steam to by-pass either or both of the heat exchangers 3 and 3ª, or means, not shown, may be provided to enable part of the heat exchangers to be by-passed by the hot gases and/or air and/or steam.

Any sensible or potential heat remaining in the blast gases and/or any sensible heat remaining in the water gas leaving the recuperator may be recovered in a waste heat boiler after, if desired, the completion of combustion of the blast gases with added air. 22 is a valve for controlling supply of tertiary air to gases entering waste heat boiler 16. 23 is the customary valve controlling the air supply for secondary combustion to the generator. 25 is the usual stack pipe with the usual outlet valve 26.

It is to be understood that the expression "gases" in the claims refers to air and steam and other gases.

What I claim is:

1. In a cyclic process for the manufacture of water gas or the like the steps of passing air and reaction gas upwardly through the generator for blasting the fuel bed and for uprun gas making, respectively, the said air and reaction gas being first preheated in a recuperator by heat exchange with the product gases of their respective passage through the generator, passing the said product gases first through a regenerator on their way to the recuperator thereby reducing in extent and rapidity cyclic fluctuations in the temperature of the product gases entering the said recuperator; and passing reaction gas for back run gas making through part of the regenerator disposed nearest to the generator without directly cooling the remaining part of the mass in the regenerator disposed nearest to the recuperator and then downwardly through the fuel bed.

2. In a cyclic process for the manufacture of water gas or the like, the steps of passing air and reaction gas upwardly through the generator for blasting the fuel bed and for uprun gas making, respectively, the said air and reaction gas being first preheated in a recuperator by heat exchange with the product gases of their respective passage through the generator, passing the said product gases first through a regenerator on their way to the recuperator thereby reducing in extent and rapidity cyclic fluctuations in the temperature of the product gases entering the said recuperator, passing reaction gas for back run gas making through part of the regenerator disposed nearest to the generator without directly cooling the remaining part of the mass in the regenerator disposed nearest to the recuperator and then downwardly through the fuel bed, the said reaction gas for back run gas making being first preheated in a recuperator by heat exchange with the product gases of their downward passage through the fuel bed.

3. In a process as set forth in claim 2, the reaction gas being steam.

NORMAN HENRY WILLIAMS.

REFERENCES CITED

The following references are of record in the file of this patent:

UNITED STATES PATENTS

| Number | Name | Date |
| --- | --- | --- |
| 1,098,534 | Servais | June 2, 1914 |
| 1,409,682 | Doherty | Mar. 14, 1922 |
| 1,799,885 | Chavanne | Apr. 7, 1931 |
| 1,814,580 | Andrews | July 14, 1931 |
| 1,833,964 | Cross | Dec. 1, 1931 |
| 1,951,990 | Noack | Mar. 20, 1934 |
| 1,964,293 | Loebell | June 26, 1934 |
| 2,153,820 | Volk | Apr. 11, 1939 |
| 2,332,781 | Cohen | Oct. 26, 1943 |

FOREIGN PATENTS

| Number | Country | Date |
| --- | --- | --- |
| 6,161 | Great Britain | of 1886 |
| 279,060 | Great Britain | Mar. 22, 1928 |